United States Patent [19]
Harada et al.

[11] 3,891,461
[45] June 24, 1975

[54] CHEMICAL PROTECTION OF ASBESTOS

[75] Inventors: Yoshiro Harada, Skokie; A. Z. Hed, Chicago, both of Ill.

[73] Assignee: The United States of America as represented by the Secretary of the Air Force, Washington, D.C.

[22] Filed: Oct. 5, 1973

[21] Appl. No.: 404,091

[52] U.S. Cl. ............................... 136/86 E; 136/143
[51] Int. Cl. ............................................ H01m 27/00
[58] Field of Search ...... 136/86 E, 86 C, 86 R, 143, 136/144

[56] References Cited
UNITED STATES PATENTS

| | | | |
|---|---|---|---|
| 3,126,302 | 3/1964 | Drushella | 136/86 R |
| 3,442,712 | 5/1967 | Roberts | 136/86 R |
| 3,481,737 | 12/1969 | Siebenberg et al. | 136/86 R |

*Primary Examiner*—John H. Mack
*Assistant Examiner*—H. A. Feeley
*Attorney, Agent, or Firm*—William J. O'Brien

[57] ABSTRACT

A method for protecting the asbestos fiber matrix of a hydrogen oxygen type fuel cell from the degradative effects induced by a potassium hydroxide fuel cell electrolyte which comprise adding potassium silicate in proper proportions to the potassium hydroxide electrolyte.

2 Claims, No Drawings

CHEMICAL PROTECTION OF ASBESTOS

BACKGROUND OF THE INVENTION

This invention relates to the chemical protection of asbestos filers. More particularly, this invention relates to the use of potassium silicate as an additive agent for use in protecting the asbestos fiber matrix of a hydrogen-oxygen fuel cell from the degradative effects of potassium hydroxide.

Recent developments in aerospace technology has created considerable interest in the utilization of hydrogen-oxygen fuel cells as an efficient and reliable source of electrical energy. This type of fuel cell uses aqueous potassium hydroxide as its electrolyte. This type of electrolyte is retained by a fibrous matrix, and chrysotile asbestos fibers have proven to be an excellent mat material.

Chrysotile is a crystalline substance and the principal mineral constituent of the commercial form of asbestos. It is chemically defined by the following formula:

(1) $3\text{ MgO}.2\text{ SiO}_2.2\text{H}_2\text{O}$

It is an extremely fine, fibrous material that finds many applications because of its desirable flexibility, capillarity and fire retardant properties. Microstructural examination of asbestos using scanning electron microscopy (SEM) reveals the fibrous nature of the material and representative photographs show that fiber bundles of 1 to $4\mu$ diameter make up the bulk of asbestos. In higher magnification (6000X), very fine fibrils of less than $0.1\mu$ are evident revealing the high surface area which contributes to the excellent capillary properties exhibited by asbestos.

The basis for using asbestos as a matrix material for fuel cells resides in its excellent capillarity and ability to hold a considerable volume of electrolyte. The large capillarity of the asbestos prevents "blow-through" under high gas pressure conditions. However, the excellent physical properties of asbestos are offset by its susceptibility to chemical, and hence, mechanical degradation in a hot potassium hydroxide electrolyte. This problem becomes especially acute when the operating temperature of the fuel cell is raised to 150°C or higher in order to realize higher energy outputs.

With the present invention, however, it has been found that the degradative effects of a hot 40 to 60 percent potassium hydroxide solution can be reduced essentially to zero by adding proper molar ratios of pure potassium silicate to the electrolyte solution in the fuel cell. The fuel cell asbestos matrix is preserved and its utility is extended for a long period, even at temperatures of from 150° to 200°C, when the proper amount of silicate is added to the solution.

SUMMARY OF THE INVENTION

In accordance with this invention, it has been found that the resistance of the chrysotile asbestos matrix of a hydrogen oxygen type fuel cell to the degradative effects of hot potassium hydroxide can be increased in a markedly and unexpected manner by using potassium silicate as an additive agent to the cell's electrolyte. The potassium silicate stabilizes the asbestos-potassium hydroxide reaction that occurs when these two materials are combined, and improves the resistance of the asbestos so that the asbestos can function satisfactorily as a matrix mat for fuel cells that operate at temperatures in excess of 100°C. The amounts of potassium silicate required on a weight ratio basis with potassium hydroxide (KOH) are about 0.1 in a 40 percent KOH system and about 0.15 in a 60 percent KOH system, both at 150° and 200°C.

Accordingly, the primary object of this invention is to provide a method for improving the chemical resistance of asbestos to the degradative effects of hot caustic solutions.

Another object of this invention is to provide a method for increasing the operational life of the asbestos matrix employed in hydrogen-oxygen type fuel cells.

Still another object of this invention is to provide a method for chemically protecting asbestos through the use of a potassium silicate additive.

The above and still other objects and advantages of the present invention will become more readily apparent upon consideration of the following detailed disclosure thereof when taken in conjunction with the accompanying drawings.

DESCRIPTION OF THE PREFERRED EMBODIMENT

Persuant to the above-mentioned and still other objects, this invention is predicated upon the discovery that the addition of potassium silicate to the asbestos matrix-potassium hydroxide electrolyte system of a fuel cell will stabilize the system and extend the life of the system especially at operational temperatures in excess of 100°C.

Current fuel cell technology for various aerospace applications invoke the use of hydrogen-oxygen type fuel cells in which the aqueous potassium electrolyte is retained by an asbestos mat. Asbestos is employed as the mat or matrix because of its desirable physical properties. However, these properties are offset because of its susceptibility to chemical, and hence, mechanical degradation in hot potassium hydroxide when the operating temperature of the cell is raised to temperatures of from 100° to 200°C.

The primary object of this invention, therefore, is to develop a method for improving the chemical resistance of asbestos to hot KOH while retaining its desirable morphological features. Although other materials such as potassium titanate or zirconia are known to be more chemically resistant to KOH, the vastly superior structure of asbestos makes it the prime candidate for matrix materials.

In order to accomplish this objective, it is first necessary to study and understand the mechanism of the KOH-asbestos corrosion reaction. The chemical reaction has been established as producing $Mg(OH)_2$ plus soluble potassium silicate, the extent of the reaction depending on environmental parameters such as KOH concentration, temperature and time.

The reaction which occurs during exposure of asbestos to hot KOH can be represented as follows:

(2) $Mg_3Si_2O_5(OH)_4 + KOH \rightarrow 3Mg(OH)_2 + $ soluble silicates (aq)

The corrosion of asbestos in hot KOH has been demonstrated to occur by the leaching of silicon from the asbestos, forming an insoluble magnesium hydroxide product and soluble potassium silicates. The degradation of the asbestos matrix as a result of reaction (2) above reduces the life of the fuel cell to very short periods of time. It was hypothesized that if this reaction could be interupted or stabilized, then the operational life of the fuel would be markedly increased, since the asbestos would, in effect, be protected from the corrosive action of the potassium hydroxide and its desirable morphology retained.

The basic study of the potassium hydroxide-asbestos corrosion reaction involved determinations of the nature of the reaction and of the effects of various environmental parameters on the extent of the reaction. The reaction parameters studied were threefold as follows. First, a potassium hydroxide electrolyte concentration of 20 percent, 40 percent and 60 percent. Secondly, the electrolyte-asbestos mixture was heated to a temperature of 150° and 200°C for each concentration and, thirdly, held at that temperature for periods of from 2 to 665 hours.

The corrosion tests were conducted as follows: The reactants (asbestos and KOH solution) were placed in FEP Teflon bottles which are essentially inert in hot KOH up to 205°C. These bottles were, in turn, placed in a conventional steel pressure vessel incorporating a silicone O-ring seal design. The system was then heated in a circulating air oven under the particular time-temperature conditions desired. The temperature of the bomb, i.e., the pressure vessel, was monitored with an attached chromel-alumel thermocouple.

Upon completion of a particular treatment, the residue was separated by filtration and repeated washing in a Buchner funnel. This was done in order to remove completely the soluble species, i.e., the KOH and soluble silicates, so that an accurate gravimetric analysis to determine extent of conversion could be obtained. This was particularly significant for corrosion tests involving 60 percent KOH in which copious amounts of water were required to remove the alkali. Washing with hot (~ 80°C) water was continued until the pH of the filtrate was essentially neutral, thus indicating complete removal of the soluble components. The precipitate was dried at 120°C for 16 hours prior to weight analysis.

As a result of the basic study of the corrosion reaction, it was found that the addition of a soluble potassium silicate reaction product to the KOH asbestos mixture forced the reaction toward the reactants and effectively stopped the reaction. This has been accomplished for temperatures up to 200°C and for KOH concentrations up to about 60 percent.

The chemical modification or stabilization of the corrosion reactive provides a means for obtaining a satisfactory matrix material for hydrogen-oxygen fuel cells.

The ideal situation would be the complete stabilization of the asbestos-KOH reaction so that the matrix-electrolyte interaction would be chemically static. As was stated heretofore, it was hypothesized that the reaction could be brought to equilllibrium by addition of a soluble potassium silicate. Actual experiments conducted in accordance with the concept of this invention show that the corrosion reaction is stopped by the addition of suitable amounts of potassium silicate, both at 150° and 200°C and at KOH concentrations of 40 percent or 60 percent. This is a particularly significant development in that the system is stabilized, and the life expectancy of the asbestos matrix becomes essentially unlimited.

To further illustrate specific embodiments of the invention with greater particularity, the following detailed examples are presented. The examples disclose results achieved in studying two major electrolyte-asbestos systems involving potassium hydroxide concentrations of 40 percent and 60 percent. These concentrations were examined as being the concentrations of most interest for actual hardware applications.

The particular soluble potassium silicate used to stabilize the asbestos-KOH reaction in the examples of this invention is PS7 marketed by GTE Sylvania Incorporated. This material, chosen for its high purity, comes in a water solution, and the critical data for it are shown as follows in Table I.

Table I

| | |
|---|---|
| Specific gravity | 1.333 |
| $K_2O$ | 11.35 |
| $SiO_2$ | 23.90 |
| Mol ratio, $K_2O:SiO_2$ | 1:3.30 |
| Total Solids | 35.25% |
| Fe | 0.003 |
| Cu | $<4 \times 10^{-6}$ |

EXAMPLE 1

In an effort to stabilize the KOH-asbestos reaction in a 40 percent KOH system, varying amounts of PS7 (potassium silicate) were added to 40 percent KOH-asbestos systems, and these were subjected to 20 hour corrosion tests at 150° and 200°C. The results of these studies, indicate that over the PS7:KOH ratio examined reaction has essentially been eliminated as reflected in the very small weight changes. In contrast, systems not incorporating PS7 show weight losses of about 12 percent (150°C) and 18 percent (200°C).

The stabilization of the reaction was also indicated in X-ray studies which showed no evidence of $Mg(OH)_2$. Microstructural studies using scanning electron microscopy show the fibrous morphology of the system to be characteristic of non-corroded asbestos. No evidence was found of any $Mg(OH)_2$ crystal formation.

The PS7:KOH weight ratio for equilibration of 40 percent KOH systems appeared to be about 0.10 at either 150°C or 200°C. Theoretically, the equilibrium constant should be higher at 200°C; however, over the temperature range which was studied, the difference may be too small to detect in these studies. An interesting aspect of the data was the apparent trend toward small weight gains for the system with increasing PS7 content. This may be due to some thin surface reaction on the asbestos bundles with the potassium silicate to form a magnesium silicate phase.

EXAMPLE 2

In an effort to stabilize systems incorporating a 60 percent KOH solution, the PS7:KOH ratio necessary for equilibration for a 20 hour exposure appeared to be about 0.15. For systems in which the potassium silicate is not added, weight losses of about 28 percent (150°C) and 35 percent (200°C) have been shown to occur. As in the case of 40 percent KOH systems this ratio may be applied at either 150° or 200°C. Below this 0.15 level, the extent of the KOH-asbestos reaction increases with decreasing ratios of PS7:KOH, and the reaction is greater at 200° than at 150°C for equivalent system compositions.

The fact that a PS7:KOH ratio of 0.15 is required at a 60 percent KOH concentration as compared to about 0.1 at 40 percent KOH may be explained by examination of the equilibrium constant for the asbestos-KOH reaction. Since the formula for the silicate reaction product has not been determined at this time, the mass balance may be represented as:

(3) $Mg_3Si_2O_5(OH)_4 + KOH = 3Mg(OH)_2 + 1/a\, K_aSi_bO_c$

The equilibrium constant, K, may then be shown as:

(4) $$K = \frac{[K_aSi_bO_c]^{1/a}}{KOH}$$

Thus, if the KOH concentration is increased from 40 percent to 60 percent, then the silicate content ($K_aSi_bO_c$) must be raised to a value which will maintain K a constant, keeping in mind the exponent $1/a$. Based on the experimental values of 0.1 (40 percent KOH) and 1.15 (60 percent KOH), calculations show that the value for $a$ is 2.0.

The results of the stabilization studies detailed in Example 1 and 2 above, clearly show that the KOH-asbestos corrosion reaction can be essentially eliminated by the incorporation of a potassium silicate solution into the system. This unexpected development is extremely important in that the KOH-asbestos reaction and associated problems in a fuel cell may be eliminated.

While the principle of this invention has been described with particularity, it should be understood that various modifications and alterations can be made without departing from the spirit of the invention, the scope of which is defined by the appended claims.

What is claimed is:

1. A method for producing an activatable hydrogen-oxygen type fuel cell characterized by having an operational feasibility over extended periods of time which comprises the steps of:
   a. providing said cells with an electrolyte system which comprises a mixture of (1) potassium hydroxide in concentration range of from 40 percent to 60 percent and (2) asbestos fibers for retaining said electrolyte; and
   b. adding potassium silicate to said electrolyte system to stabilize the corrosive chemical reaction occurring between said hydroxide and said asbestos at temperatures in excess of 100°C.

2. A method in accordance with claim 1 wherein said potassium silicate is added in a weight ratio of from about 0.05 to 0.15 parts of said silicate to one part of said hydroxide.

* * * * *

UNITED STATES PATENT OFFICE
CERTIFICATE OF CORRECTION

PATENT NO. : 3,891,461
DATED : June 24, 1975
INVENTOR(S) : Yoshiro Harada, A. Z. Hed, and William B. Crandall It is certified that error appears in the above-identified patent and that said Letters Patent are hereby corrected as shown below:

In the bibliography data on Page 1, further identified as ICIREPAT No 75, the listing of the inventors "Yoshiro Harada, Skokie; A. Z. Hed, Chicago, both of Ill." should be changed to read --Yoshira Harada, Skokie; A. Z. Hed, Chicago; William B. Crandall, Wheaton; all of Ill.--.

Signed and Sealed this twenty-fourth Day of February 1976

[SEAL]

Attest:

RUTH C. MASON
*Attesting Officer*

C. MARSHALL DANN
*Commissioner of Patents and Trademarks*